US010414444B2

(12) United States Patent
Kawabe

(10) Patent No.: US 10,414,444 B2
(45) Date of Patent: Sep. 17, 2019

(54) VEHICLE REAR END STRUCTURE

(71) Applicant: HONDA MOTOR CO., LTD., Minato-Ku, Tokyo (JP)

(72) Inventor: Satoru Kawabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 15/551,506

(22) PCT Filed: Feb. 17, 2016

(86) PCT No.: PCT/JP2016/054578
§ 371 (c)(1),
(2) Date: Aug. 16, 2017

(87) PCT Pub. No.: WO2016/133120
PCT Pub. Date: Aug. 25, 2016

(65) Prior Publication Data
US 2018/0037270 A1 Feb. 8, 2018

(30) Foreign Application Priority Data

Feb. 18, 2015 (JP) ................. 2015-029568

(51) Int. Cl.
*B62D 25/20* (2006.01)
*B62D 25/08* (2006.01)
(52) U.S. Cl.
CPC ............ *B62D 25/20* (2013.01); *B62D 25/08* (2013.01); *B62D 25/2027* (2013.01)
(58) Field of Classification Search
CPC ..... B62D 25/20; B62D 25/08; B62D 25/2027
See application file for complete search history.

(56) References Cited

U.S. PATENT DOCUMENTS 4,557,519 A    12/1985 Matsuura
2009/0167054 A1    7/2009 Niezur et al.
(Continued)

FOREIGN PATENT DOCUMENTS

CN    1865063 A    11/2006
CN    101746420 A    6/2010
(Continued)

OTHER PUBLICATIONS

Office Action, a Notification of Reasons for Refusal, dated Sep. 20, 2018, issued in the correspondint Chinese patent application 201680010160.1.

*Primary Examiner* — D Glenn Dayoan
*Assistant Examiner* — Melissa A Black
(74) *Attorney, Agent, or Firm* — Carrier Blackman & Associates, P.C.; William D. Blackman; Joseph P. Carrier

(57) ABSTRACT

Provided is a vehicle rear end structure capable of reducing weight of a vehicle body, and achieving satisfactory rear end collision performance. A vehicle rear end structure includes: a left/right pair of frames; a floor panel having a floor tunnel in a convex shape protruding upward when viewed in the vehicle longitudinal direction, and a high floor portion higher than the floor tunnel; a rear cross member connected to the left/right pair of frames, and having a V-shape with an apex at the vehicle front side in plan view; and a tunnel connection portion connecting the floor tunnel and the apex of the rear cross member. A top surface of the floor tunnel, a bottom surface of the tunnel connection portion, and a bottom surface of the rear cross member are arranged in an approximately straight line, when seen from the lateral side of the vehicle.

15 Claims, 6 Drawing Sheets

(56) References Cited

U.S. PATENT DOCUMENTS

2010/0156146 A1 6/2010 Matsuyama
2012/0212009 A1 8/2012 Ishizono et al.

FOREIGN PATENT DOCUMENTS

| CN | 102574552 A | | 7/2012 |
|---|---|---|---|
| EP | 0 931 716 A1 | | 7/1999 |
| EP | 1 724 184 A2 | | 11/2006 |
| JP | 2007-320341 A | | 12/2007 |
| JP | 2010195257 A | * | 9/2010 |

* cited by examiner

VEHICLE REAR END STRUCTURE

TECHNICAL FIELD

The present invention relates to a vehicle rear end structure.

BACKGROUND ART

Conventionally, as a structure for improving rear end collision performance of a vehicle body, Patent Document 1 describes a vehicle rear end structure including a rear cross member having a body portion connected to left and right rear side frames and a forward extending portion extending forward from a center in a vehicle width direction of the body portion, wherein the forward extending portion extends into a tunnel portion of a front panel and is connected to a floor cross member.

CITATION LIST

Patent Literature

Patent Document 1: Japanese Patent No. 5375181

SUMMARY OF INVENTION

Technical Problem

In the vehicle rear end structure described in Patent Document 1, since the forward extending portion of the rear cross member extends into the tunnel portion and is connected to the floor cross member, there is a problem that the forward extending portion is long and a weight of the vehicle body increases.

The present invention has been made in view of the above problems, and an object of the present invention is to provide a vehicle rear end structure capable of reducing the weight of the vehicle body and achieving satisfactory rear end collision performance.

Solution to Problem

In order to solve the above problems, a vehicle rear end structure of the present invention includes: a pair of left and right frames extending in a vehicle front-rear direction; a floor panel provided between the pair of left and right frames and having a floor tunnel and a high floor portion, the floor tunnel extending in the vehicle front-rear direction and having an upwardly convex shape when viewed from the vehicle front-rear direction, and the high floor portion being formed behind the floor tunnel in the vehicle front-rear direction and being higher than the floor tunnel; a cross member connected to the pair of left and right frames below the high floor portion and having a V-shape with an apex in a vehicle front direction in plan view; and a tunnel connection portion connecting the floor tunnel and the apex of the cross member, wherein a top surface of the floor tunnel, a bottom surface of the tunnel connection portion and a bottom surface at the apex of the cross member are arranged in a substantially straight line when viewed from a vehicle side direction.

In the present invention, the term "arranged in a substantially straight line" means that adjacent surfaces are arranged in a straight line or they are arranged to overlap ends thereof, to be in a substantially straight line. Since the adjacent surfaces are arranged in a substantially straight line, a load input in a direction of a surface is transmitted in a direction of another adjacent surface.

With this configuration, the top surface of the floor tunnel, the bottom surface of the tunnel connection portion and the bottom surface at the apex of the cross member are arranged in a substantially straight line when viewed from the vehicle side direction, so that a force component of a collision load can be transferred from the cross member to the floor tunnel through the relatively short tunnel connection portion. Therefore, it is possible to reduce the weight of the vehicle body and to achieve satisfactory rear end collision performance. Further, the floor tunnel and the apex of the cross member having a V-shape in plan view are connected through the tunnel connection portion, and thus it is possible to prevent lateral toppling of the frames at the time of rear collision and to distribute a rear collision load also in the vehicle front-rear direction. Further, since the tunnel connection portion is not provided in the floor tunnel, it is possible to effectively use a space in the floor tunnel, for example, by arranging an exhaust pipe, a fuel pipe or a propeller shaft in case of a four-wheel drive vehicle in the floor tunnel. Furthermore, it is possible to distribute vibration of the floor panel by an input from an engine or a road surface to the cross member through the tunnel connection portion, thereby improving ride comfort of a vehicle.

The tunnel connection portion preferably forms a closed section with the floor panel when viewed from the vehicle front-rear direction.

With this configuration, it is possible to increase rigidity of the tunnel connection portion to prevent displacement in the vehicle front-rear direction, that is, out-of-plane deformation of the bottom surface of the tunnel connection portion, thereby properly transmitting the rear collision load to the floor tunnel.

The cross member preferably has a groove extending from the apex side to an end side thereof.

With this configuration, it is possible to increase the number of ridge lines to improve transmission of the load (rear collision load from the floor panel through the tunnel connection portion) through the rear cross member.

A lower arm is preferably attached to the cross member in a vicinity of the tunnel connection portion.

With this configuration, it is possible to distribute lateral force load, which is a main input when the vehicle turns, to the floor panel through the tunnel connection portion in addition to bending deformation of the frame using an axial force of the cross member, thereby reducing weight of the cross member.

The frame preferably comprises a bent portion, and an end of the cross member is preferably connected to the bent portion.

With this configuration, the bent portion of the frame is reinforced by the cross member to be increased in rigidity, and thus it is possible to improve load transmission from a rear to a front of the bent portion of the frame.

Preferably, the floor panel includes a floor recessed portion formed in the high floor portion and having a downwardly convex shape when viewed from the vehicle front-rear direction, a stiffener is provided at a central portion in a vehicle left-right direction below the floor recessed portion, and the stiffener is connected to the cross member.

With this configuration, for example, when a load is applied to the stiffener during towing of the vehicle, the load can be distributed to the cross member, and thus it is possible to reduce weight of the stiffener.

Preferably, the cross member includes a body member having a cutting portion extending from the apex side to an end side of the cross member, and a groove forming member having a groove extending from the apex side to the end side of the cross member and being attached to the cutting portion, wherein a flange of the tunnel connection portion and a flange of the groove forming member are joined with the body member interposed therebetween.

With this configuration, the groove forming member and the tunnel connection portion are joined with the body member interposed therebetween, and thus it is possible to promote transmission of the rear collision load.

Preferably, a pair of left and right ridge lines formed at left and right ends of the top surface of the floor tunnel and a pair of left and right ridge lines formed at left and right ends of the bottom surface of the tunnel connection portion are respectively continuous with each other on left and right sides.

With this configuration, it is possible to properly transmit the rear collision load from the tunnel connection portion to the floor tunnel.

Preferably, a pair of left and right ridge lines formed in a front portion of the cross member and a pair of left and right ridge lines formed at left and right ends of the bottom surface of the tunnel connection portion are respectively continuous with each other on left and right sides.

With this configuration, it is possible to properly transmit the rear collision load from the cross member to the tunnel connection portion.

Advantageous Effects of Invention

According to the present invention, it is possible to reduce the weight of the vehicle body and to achieve satisfactory rear end collision performance.

DESCRIPTION OF EMBODIMENTS

Figure 1:
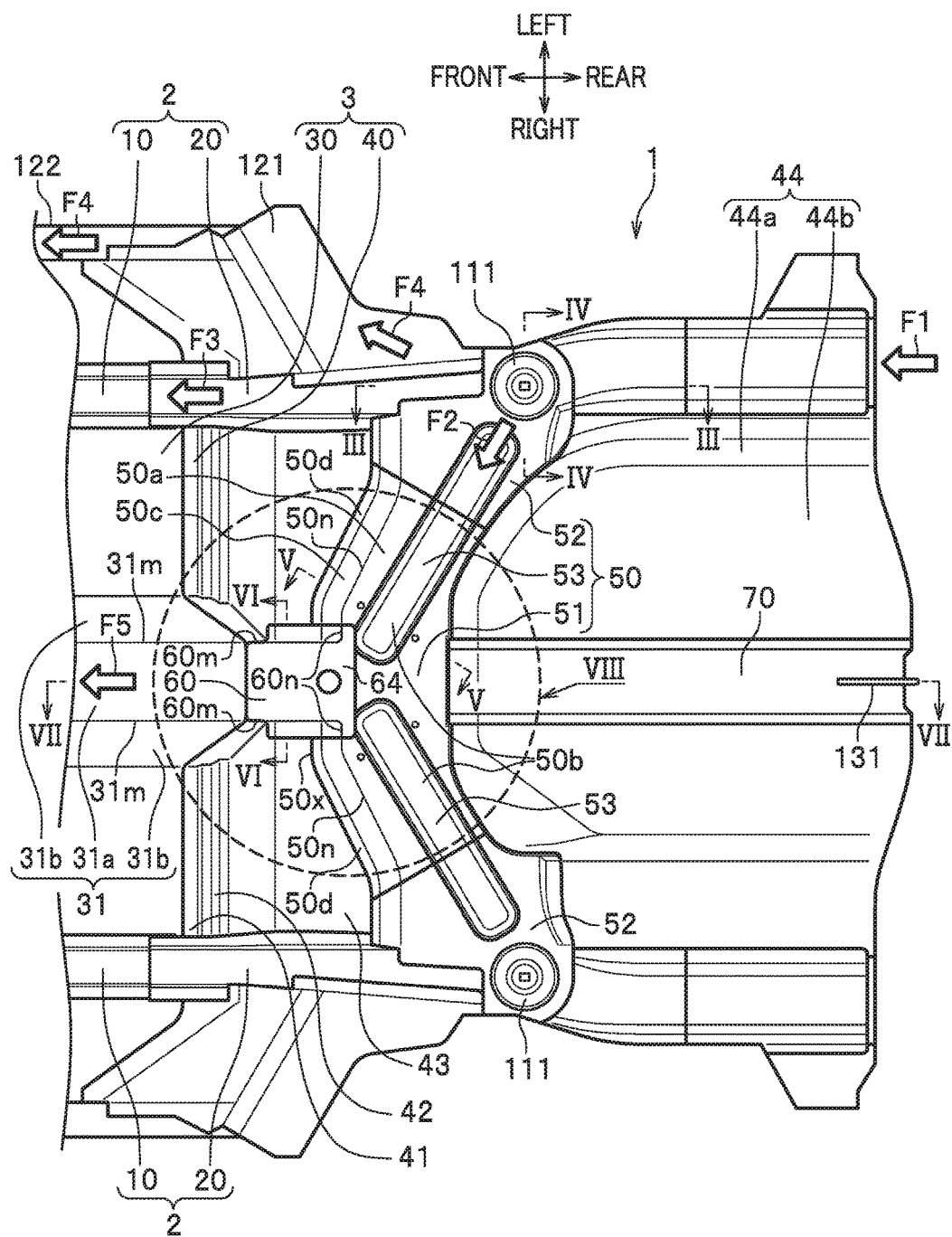
FIG. 1 is a bottom surface view showing a vehicle rear end structure according to an embodiment of the present invention.

Embodiments of the present invention will be described in detail with reference to the drawings. The same components are denoted by the same reference numerals, and redundant description will be omitted. "Front-rear", "up-down" and "left-right" shown by arrows in the drawings respectively indicate a vehicle front-rear direction, a vehicle up-down direction and a vehicle left-right direction (vehicle width direction) when viewed from a driver's seat.

Figure 2:
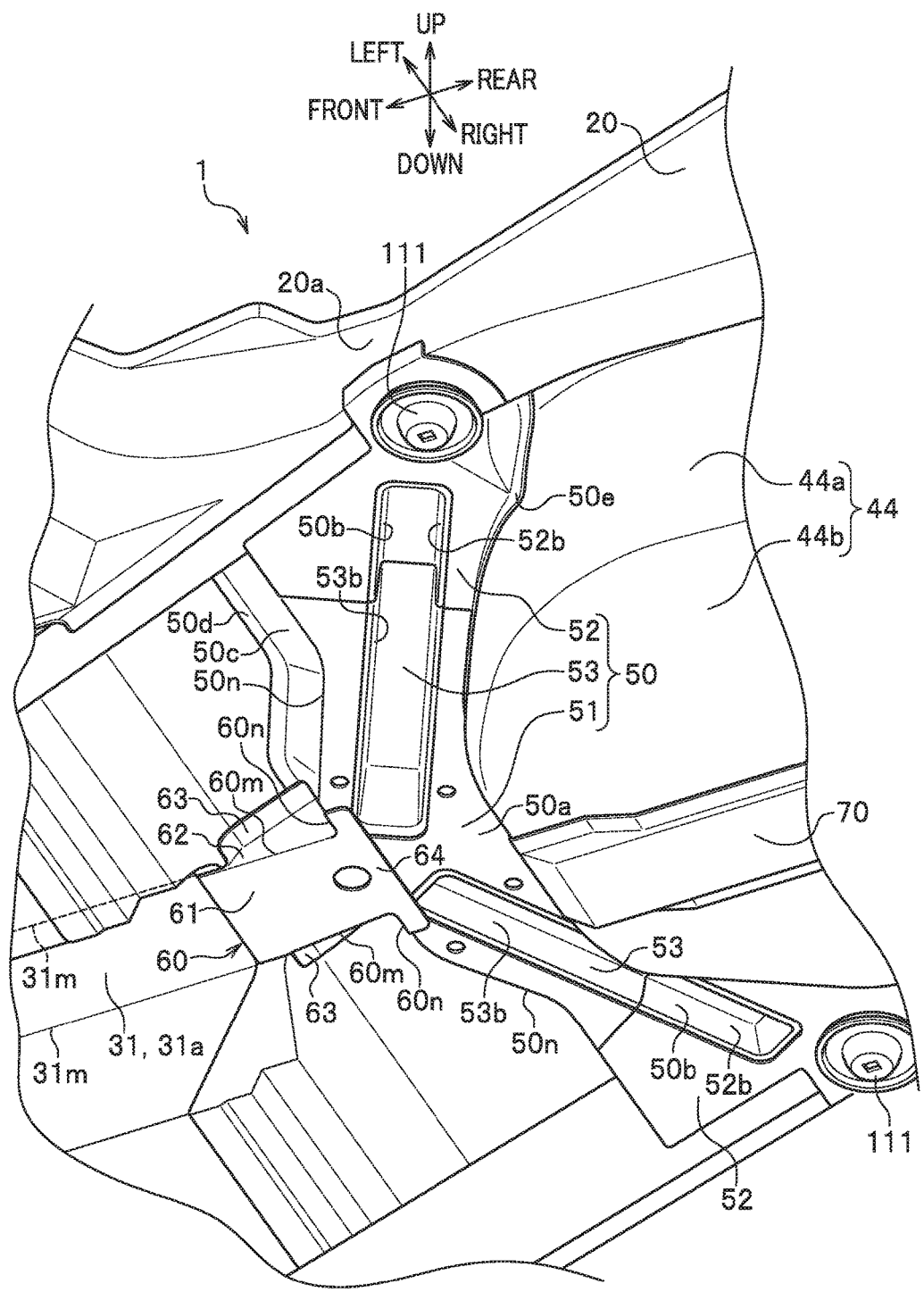
FIG. 2 is a perspective view showing the vehicle rear end structure according to the embodiment of the present invention.

As shown in FIGS. 1 and 2, a vehicle rear end structure 1 according to an embodiment of the present invention includes a pair of left and right frames 2, a floor panel 3 provided between the pair of left and right frames 2, a rear cross member 50, a tunnel connection portion 60 and a rear stiffener 70.

<Frame>

The pair of left and right frames 2 extends in the vehicle front-rear direction. The frame 2 is a metal member forming a closed section in front view. The frame 2 is formed by joining a front floor frame 10 and a rear frame 20 by welding or the like.

<Rear Frame>

Figure 3:
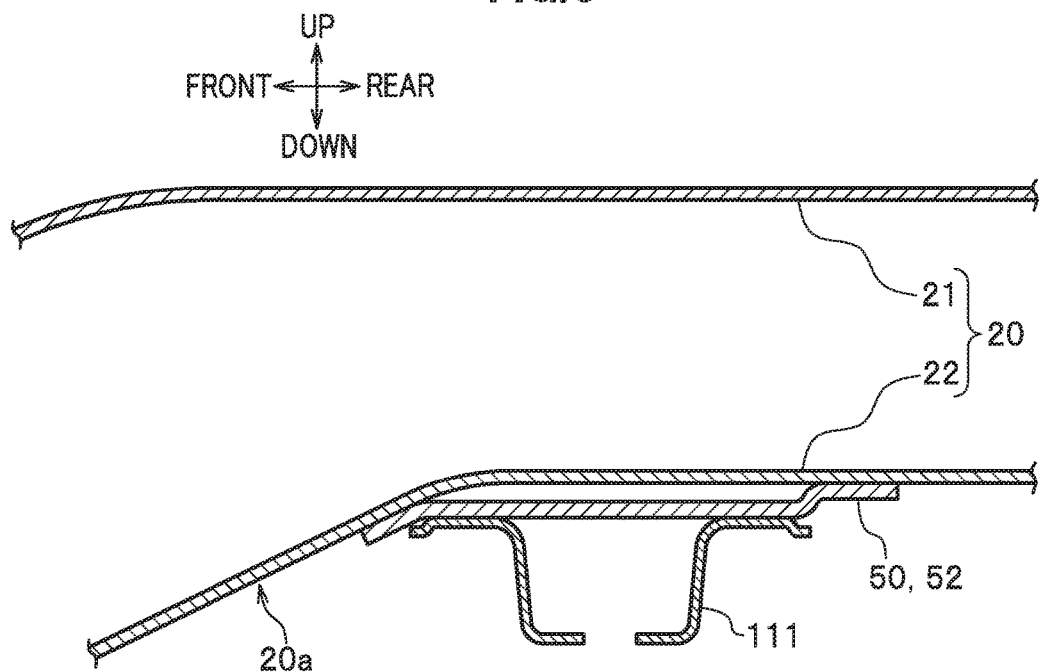
FIG. 3 is an end view taken along a line III-III of FIG. 1.
Figure 4:
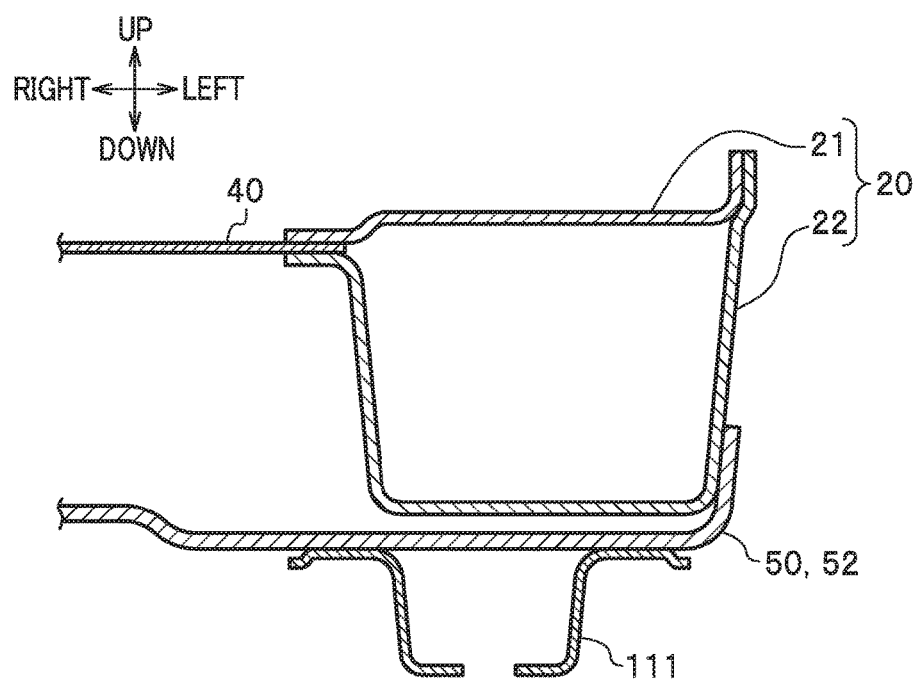
FIG. 4 is an end view taken along a line IV-IV of FIG. 1.

As shown in FIGS. 3 and 4, the rear frame 20 is formed by joining a rear frame upper portion 21 composed of a top surface and a rear frame lower portion 22 composed of a bottom surface and left and right side surfaces by welding or the like with a rear floor panel 40 interposed therebetween and to be described below. A wheel house is formed outside the rear frame 20, and a wheel is disposed in the wheel house. A portion connected with the rear cross member 50 in the rear frame 20, that is, a bottom surface of the rear frame lower portion 22 in a bent portion 20a in the present embodiment has substantially the same height as that of a top surface 31a of a floor tunnel 31 and a bottom surface 61 of the tunnel connection portion 60, which will be described below. The bent portion 20a will also be described below.

<Floor Panel>

As shown in FIGS. 1 and 2, the floor panel 3 is a metal plate member provided between the pair of left and right frames 2 and forming a floor surface of a vehicle body. The floor panel 3 is formed by joining a front floor panel 30 and a rear floor panel 40 by welding or the like.

<Front Floor Panel>

Left and right ends of the front floor panel 30 are respectively joined to the floor frames 10 by welding or the like. The front floor panel 30 includes the floor tunnel 31.

<Floor Tunnel>

The floor tunnel 31 extends in the vehicle front-rear direction at a central portion in the vehicle left-right direction of the front floor panel 30. The floor tunnel 31 is composed of the top surface 31a and a pair of left and right side surfaces 31b and has an upwardly convex shape in front view (that is, when viewed from the vehicle front-rear direction). Ridge lines 31m are formed respectively between the top surface 31a and the pair of left and right side surfaces 31b of the floor tunnel 31. A rear end of the floor tunnel 31 is open at a rear end of the front floor panel 30.

<Rear Floor Panel>

Left and right ends of the rear floor panel 40 are respectively joined to the rear frames 20 by welding or the like. The rear floor panel 40 includes a joining portion 41, a step portion 42, a high floor portion 43 and a floor recessed portion 44 in order from a front side.

The joining portion 41 is a front end of the rear floor panel 40, and is overlapped with a lower surface of the rear end of the front floor panel 30 to be joined by welding or the like. The step portion 42 is formed behind the joining portion 41 and is slightly higher than the joining portion 41. The joining portion 41 and the step portion 42 are divided into left and right by the floor tunnel 31.

The high floor portion 43 is formed behind the step portion 42 and is higher than the top surface 31a of the floor tunnel 31. The floor recessed portion 44 is formed in a portion separated rearward from the step portion 42 via the high floor portion 43. The floor recessed portion 44 is composed of a side surface 44a and a bottom surface 44b and has a downwardly convex shape in front view. The bottom surface 44b of the floor recessed portion 44 is formed at substantially the same height as a portion other than the floor tunnel 31 of the front floor panel 30. The floor recessed portion 44 is used as a housing portion of, for example, a spare tire and a rechargeable battery.

<Rear Cross Member>

The rear cross member 50 is bridged between the pair of left and right frames 2 (in the present embodiment, the pair of left and right frames 20) below the high floor portion 43, and is a metal member having a V-shape with an apex 50x in a vehicle front direction in plan view. In other words, the rear cross member 50 has the apex 50x located most forward and extends rearwardly from the apex 50x to left and right ends thereof. The left and right ends of the rear cross member 50 are respectively connected to the pair of left and right rear frames 20. The rear cross member 50 includes a bottom surface 50a, a pair of left and right grooves 50b, a front side surface 50c and flanges 50d, 50e.

Figure 5:
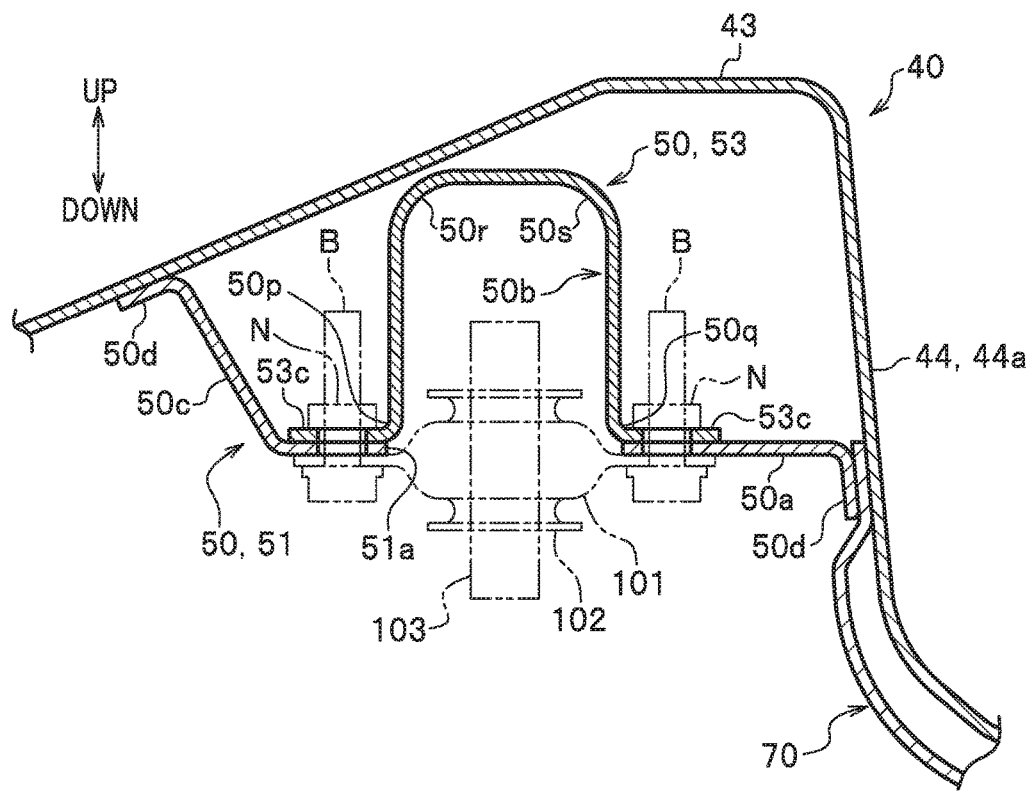
FIG. 5 is an end view taken along a line V-V of FIG. 1.

As shown in FIGS. 1, 2 and 5, the bottom surface 50a is a portion facing and downwardly away from the high floor portion 43. The pair of left and right grooves 50b extends from the apex 50x side to end sides of the bottom surface 50a and has an upwardly convex shape in side view. The grooves 50b extend rearwardly as they extend from the apex 50x side to the end sides. Ridge lines 50p, 50q (see FIG. 5) are respectively formed between the bottom surface 50a and front and rear side surfaces of the groove 50b, and ridge lines 50r, 50s (see FIG. 5) are respectively formed between a top surface and the front and rear side surfaces of the groove 50b. A front side surface 50c extends upwardly from a front end of the bottom surface 50a. A ridge line 50n is formed between the bottom surface 50a and the front side surface 50c.

The flange 50d extends from a front end of the front side surface 50c, and is joined to a lower surface of the high floor portion 43 of the rear floor panel 40 by welding or the like. The flange 50e extends from a rear end of the bottom surface 50a, and is joined to the side surface (front side surface) 44a of the floor recessed portion 44 of the rear floor panel 40 by welding or the like.

In the present embodiment, the rear cross member 50 is formed by joining a central member 51, a pair of left and right end members 52, and a pair of left and right groove forming members 53 by welding or the like.

The central member 51 is a body member having the V-shaped apex 50x, and has a pair of left and right cutting portions 51a (see FIG. 5) extending from the apex 50x side to the end sides at a central portion in the vehicle front-rear direction.

The pair of left and right end members 52 is a member joined to left and right ends of the central member 51, and has a groove 52b constituting a portion of the groove 50b. The pair of left and right groove forming members 53 is a member attached to the pair of left and right cutting portions 51a, and has a groove 53b constituting another portion of the groove 50b and a flange 53c extending from a peripheral edge excluding an outer end of the groove 53b. The groove 50b is formed by connecting the groove 52b and the groove 53b.

As shown in FIG. 5, a lower arm 103 is attached to the rear cross member 50 in a vicinity of the tunnel connection portion 60 (see FIG. 1). In particular, a shaft 101 of a wheel suspension is fixedly fastened to a joint between the central member 51 and the flange 53c of the groove forming member 53 by bolts B. The bolts B are inserted through holes respectively formed in the central member 51 and the flange 53c of the groove forming member 53, and are fastening members for fastening the shaft 101 to the joint by being screwed into nuts N fixed to an upper surface of the flange 53c. The lower arm 103 is fixed to the shaft 101 through a bush 102. In the drawings other than FIG. 5, the shaft 101, the bush 102, the lower arm 103, the bolts B and nuts N are omitted.

As shown in FIGS. 3 and 4, the rear frame 20 has the bent portion 20a bending downward as it goes forward. The left and right ends of the rear cross member 50 are connected to the bent portions 20a, more specifically, rear ends of the bent portions 20a.

Spring attachment portions 111 are respectively joined to the left and right ends of the rear cross member 50 by welding or the like. The spring attachment portion 111 is a metal member attached with a spring of the wheel suspension.

<Tunnel Connection Portion>

As shown in FIGS. 1 and 2, the tunnel connection portion 60 is a metal member for connecting the top surface 31a of the floor tunnel 31 and the bottom surface 50a at the apex 50x of the rear cross member 50. The tunnel connection portion 60 integrally includes the bottom surface 61, a pair of left and right side surfaces 62 extending upwardly from left and right ends of the bottom surface 61, and a pair of left and right flanges 63 extending from upper ends of the pair of left and right side surfaces 62 and joined to the lower surface of the high floor portion 43 of the rear floor panel 40.

In the present embodiment, a rear end of the bottom surface 61 is a flange 64 having a shape extending leftward and rightward, and the pair of left and right side surfaces 62 have L shapes in plan view together with a shape of the bottom surface 61. That is, ridge lines 60m extending in the vehicle front-rear direction and ridge lines 60n extending in the vehicle left-right direction are respectively formed in L shapes in plan view between the bottom surface 61 and the pair of left and right side surfaces 62. The ridge line 60m is continuous with the ridge line 31m of the floor tunnel 31 and the ridge line 60n is continuous with the ridge line 50n of the rear cross member 50.

Figure 6:
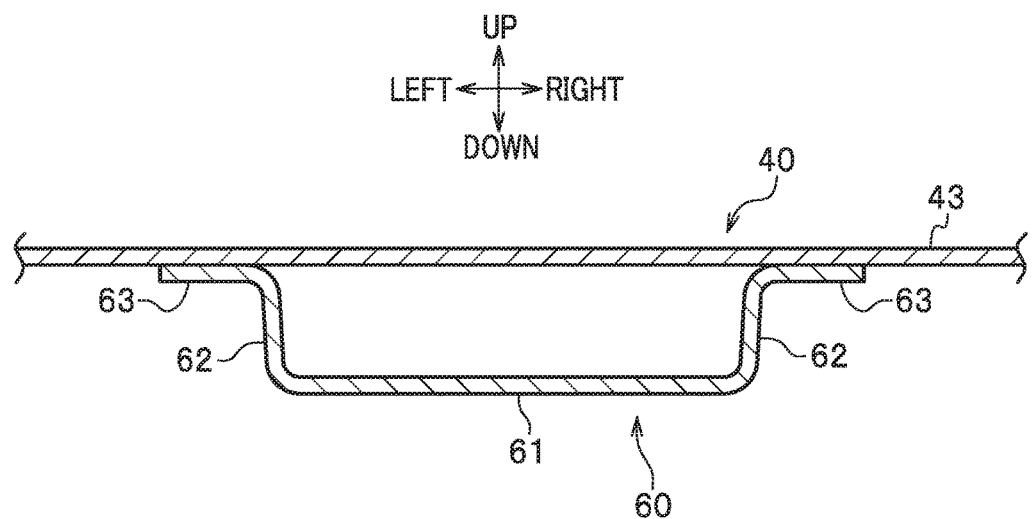
FIG. 6 is an end view taken along a line VI-VI of FIG. 1.

As shown in FIG. 6, the tunnel connection portion 60 forms a closed section with the high floor portion 43 of the rear floor panel 40 in front view.

Figure 7:
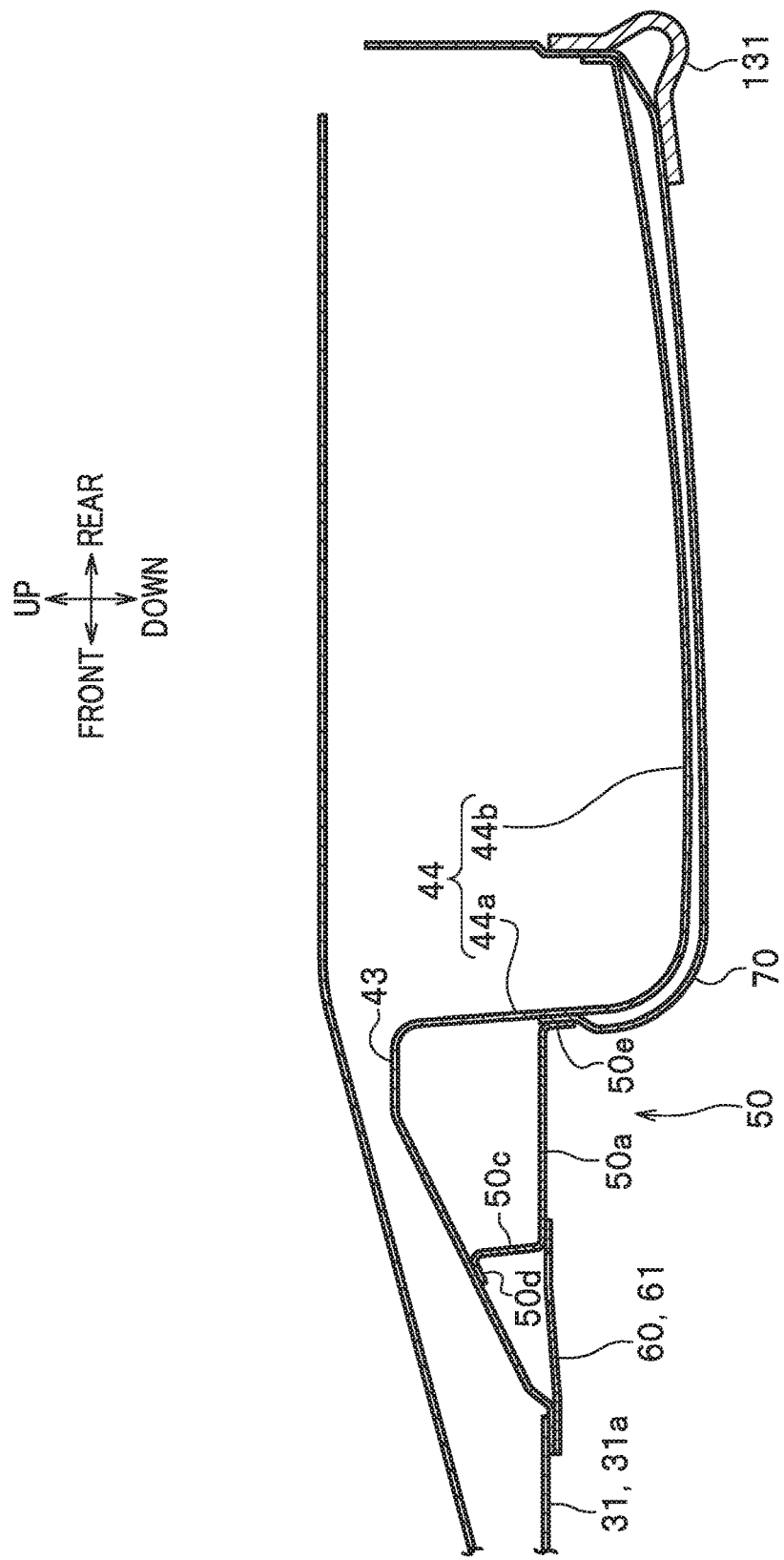
FIG. 7 is an end view taken along a line VII-VII of FIG. 1.

As shown in FIG. 7, the top surface 31a of the floor tunnel 31, the bottom surface 61 of the tunnel connection portion 60, and the bottom surface 50a at the apex 50x of the rear cross member 50 are arranged in a substantially straight line in side view (that is, when viewed from a side of the vehicle body).

Figure 8:
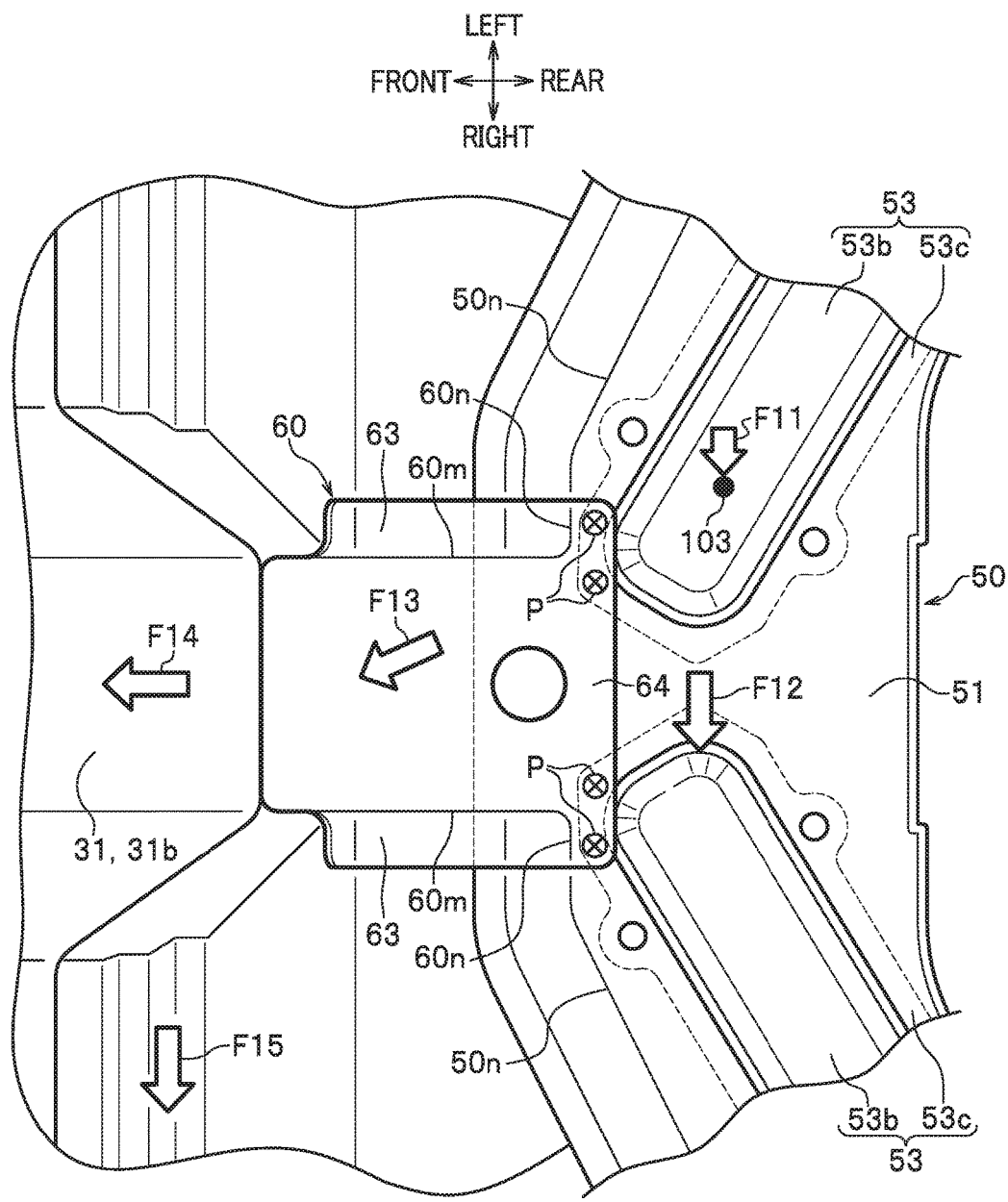
FIG. 8 is an enlarged view of a portion VIII of FIG. 1.

As shown in FIG. 8, the flange 64 of the tunnel connection portion 60 and the flange 53c of the groove forming member 53 are joined by welding or the like with the central member 51 interposed therebetween. Here, reference numerals P in FIG. 8 show an example of welding points of spot welding.

<Rear Stiffener>

As shown in FIGS. 1 and 2, the rear stiffener 70 is a metal member provided at a central portion in the vehicle left-right direction, below the bottom surface 44b of the floor recessed portion 44. As shown in FIG. 7, the rear stiffener 70 extends in the vehicle front-rear direction. A front end of the rear stiffener 70 is joined to the front side surface 44a of the floor recessed portion 44 by welding or the like, and a rear end of the rear stiffener 70 is joined to a rear end of the floor recessed portion 44, that is, a rear end of the floor panel 3 by welding or the like. A vehicle body towing hook 131 used when the vehicle body is towed rearwardly is attached to the rear end of the rear stiffener 70.

As shown in FIG. 1, in the vehicle rear end structure 1 according to the embodiment of the present invention, at the time of collision from a rear portion of the vehicle body, that is, at the time of rear collision, a collision load F1 is input to the pair of left and right rear frames 20. The collision load F1 is divided into a load F2 directed to the apex 50x from an end of the rear cross member 50, a load F3 directed to the frame 10 from the rear frame 20, and a load F4 directed to a side sill 122 from a gusset 121 at the bent portion 20a (see FIG. 3) of the rear frame 20. The loads F2 directed to the apex 50x from a pair of left and right ends of the rear cross member 50 are combined to a load F5, and the load F5 is transmitted to the floor tunnel 31 through the tunnel connection portion 60.

In the vehicle rear end structure 1 according to the embodiment of the present invention, the top surface 31a of the floor tunnel 31, the bottom surface 61 of the tunnel connection portion 60, and the bottom surface 50a at the apex 50x of the rear cross member 50 are arranged in a substantially straight line when viewed from the side of the vehicle body, and thus it is possible to transmit a component force of the collision load from the rear cross member 50 to the floor tunnel 31 through the relatively short tunnel connection portion 60. Therefore, it is possible to reduce weight of the vehicle body and to achieve satisfactory rear end collision performance. Further, in the vehicle rear end structure 1, the floor tunnel 31 and the apex 51x of the rear cross member 50 having a V-shape in plan view are connected through the tunnel connection portion 60, and thus it is possible to prevent lateral toppling of the rear frames 20 at the time of rear collision and to distribute a rear collision load also in the vehicle front-rear direction. In the vehicle rear end structure 1, the tunnel connection portion 60 is not provided in the floor funnel 31, and thus it is possible to effectively utilize a space in the floor tunnel 31, for example, by arranging an exhaust pipe, a fuel pipe, or a propeller shaft in case of a four wheel drive vehicle in the floor tunnel 31. In the vehicle rear end structure 1, vibration of the floor panel 3 by an input from an engine or a road surface can be distributed to the rear cross member 50 through the tunnel connection portion 60, and thus it is possible to improve ride comfort of a vehicle.

In the vehicle rear end structure 1, the tunnel connection portion 60 forms the closed section with the high floor portion 43 of the floor panel 3 in front view, and thus it is possible to increase rigidity of the tunnel connection portion 60 to prevent displacement in the vehicle front-rear direction, that is, out-of-plane deformation of the bottom surface 61, thereby properly transmitting the rear collision load to the floor tunnel 31.

In the vehicle rear end structure 1, the rear cross member 50 is provided with the groove 50b, and thus it is possible to increase the number of ridge lines to promote the transmission of the load (rear collision load from the floor panel 30 through the tunnel connection portion 60) through the rear cross member 50.

As shown in FIG. 8, in the vehicle rear end structure 1, a lateral force load F11 which is a main input is input to the lower arm 103 (see FIG. 5) when the vehicle turns. The lateral force load F11 is divided into a load F12 directed in a lateral direction of the rear cross member 50 from a mounting portion of the lower arm 103 and a load F13 directed to the tunnel connection portion 60. Further, the load F13 is divided into a load F14 transmitting through the top surface 31a of the floor tunnel 31 and a load F15 directed to the lateral direction of the front floor panel 30.

In the vehicle rear end structure 1, it is possible to distribute the lateral force load F11, which is the main input when the vehicle turns, to the front floor panel 30 through the tunnel connection portion 60 in addition to bending deformation of the rear frame 20 using an axial force of the rear cross member 50, thereby reducing weight of the rear cross member 50.

In the vehicle rear end structure 1, the bent portion 20a of the rear frame 20 is reinforced by the rear cross member 50 to be increased in rigidity, and thus it is possible to improve load transmission from the rear frame 20 to the floor frame 10.

In the vehicle rear end structure 1, for example, when a load is applied to the rear stiffener 70 during towing of the vehicle, the load can be distributed to the rear cross member 50, and thus it is possible to reduce weight of the rear stiffener 70.

In the vehicle rear end structure 1, the groove forming member 53 and the tunnel connection portion 60 are overlapped and joined with the central member 51 interposed therebetween, and thus it is possible to improve transmission of the rear collision load.

In the vehicle rear end structure 1, the ridge lines 60m of the tunnel connection portion 60 and the ridge lines 31m of the floor tunnel 31 are respectively continuous with each other on the left and right sides, and thus it is possible to properly transmit the rear collision load from the tunnel connection portion 60 to the floor tunnel 31.

In the vehicle rear end structure 1, the ridge lines 50n of the rear cross member 50 and the ridge lines 60n of the tunnel connection portion 60 are respectively continuous with each other on the left and right sides, and thus it is possible to properly transmit the rear collision load from the rear cross member 50 to the tunnel connection portion 60.

The embodiments of the present invention have been described above, however, the present invention is not limited to the embodiments, and modifications can be made without departing from the spirits and scope of the present invention. For example, the rear cross member 50 may be integrally molded without being divided into five members, or the rear cross member 50 and the tunnel connection portion 60 may be integrally molded.

REFERENCE SIGNS LIST

1: vehicle rear end structure
2: frame
3: floor panel
10: floor frame
20: rear frame
30: front floor panel
31: floor tunnel
31a: top surface
31m: ridge line
40: rear floor panel
41: joining portion
42: step portion
43: high floor portion
44: floor recessed portion
50: rear cross member (cross member)
50a: bottom surface
50b: groove
50n: ridge line
50p, 50q, 50r, 50s: ridge line
51: central member (body member)
51a: cutting portion
53: groove forming member
53b: groove
53c: flange
60: tunnel connection portion
61: bottom surface 63: flange
60m, 60n: ridge line
70: rear stiffener (stiffener)
103: lower arm

The invention claimed is:

1. A vehicle rear end structure comprising:
a pair of left and right frames extending in a vehicle front-rear direction;
a floor panel provided between the pair of left and right frames and having a floor tunnel and a high floor portion, the floor tunnel extending in the vehicle front-rear direction and having an upwardly convex shape when viewed from the vehicle front-rear direction, and the high floor portion being formed behind the floor tunnel in the vehicle front-rear direction and being higher than the floor tunnel;
a cross member connected to the pair of left and right frames below the high floor portion and having a V-shape with an apex in a vehicle front direction in plan view; and
a tunnel connection portion connecting the floor tunnel and the apex of the cross member,
wherein a top surface of the floor tunnel, a bottom surface of the tunnel connection portion and a bottom surface at the apex of the cross member are arranged in a substantially straight line when viewed from a vehicle side direction,
wherein the cross member comprises:
a body member having a cutting portion extending from the apex side to an end side of the cross member; and
a groove forming member having a groove extending from the apex side to the end side of the cross member and being attached to the cutting portion,
and wherein a flange of the tunnel connection portion and a flange of the groove forming member are joined, with the body member interposed therebetween.

2. The vehicle rear end structure according to claim 1, wherein the tunnel connection portion forms a closed section with the floor panel when viewed from the vehicle front-rear direction.

3. The vehicle rear end structure according to claim 1, wherein the cross member has a groove extending from the apex side to an end side thereof.

4. The vehicle rear end structure according to claim 1, wherein a lower arm is attached to the cross member in a vicinity of the tunnel connection portion.

5. The vehicle rear end structure according to claim 1, wherein the frame comprises a bent portion, and an end of the cross member is connected to the bent portion.

6. The vehicle rear end structure according to claim 1, wherein
the floor panel comprises a floor recessed portion formed in the high floor portion and having a downwardly convex shape when viewed from the vehicle front-rear direction,
a stiffener is provided at a central portion in a vehicle left-right direction below the floor recessed portion, and
the stiffener is connected to the cross member.

7. The vehicle rear end structure according to claim 1, wherein a pair of left and right ridge lines formed at left and right ends of the top surface of the floor tunnel and a pair of left and right ridge lines formed at left and right ends of the bottom surface of the tunnel connection portion are respectively continuous with each other on left and right sides.

8. The vehicle rear end structure according to claim 1, wherein a pair of left and right ridge lines formed in a front portion of the cross member and a pair of left and right ridge lines formed at left and right ends of the bottom surface of the tunnel connection portion are respectively continuous with each other on left and right sides.

9. A vehicle rear end structure comprising:
a pair of left and right frames extending in a vehicle front-rear direction;
a floor panel provided between the pair of left and right frames and having a floor tunnel and a high floor portion, the floor tunnel extending in the vehicle front-rear direction and having an upwardly convex shape when viewed from the vehicle front-rear direction, and the high floor portion being formed behind the floor tunnel in the vehicle front-rear direction and being higher than the floor tunnel;
a cross member connected to the pair of left and right frames below the high floor portion and having a V-shape with an apex in a vehicle front direction in plan view; and
a tunnel connection portion connecting the floor tunnel and the apex of the cross member,
wherein a top surface of the floor tunnel, a bottom surface of the tunnel connection portion and a bottom surface at the apex of the cross member are arranged in a substantially straight line when viewed from a vehicle side direction,
and wherein a pair of left and right ridge lines formed in a front portion of the cross member, and a pair of left and right ridge lines formed at left and right ends of the bottom surface of the tunnel connection portion are respectively continuous with each other on left and right sides.

10. The vehicle rear end structure according to claim 9, wherein the tunnel connection portion forms a closed section with the floor panel when viewed from the vehicle front-rear direction.

11. The vehicle rear end structure according to claim 9, wherein the cross member has a groove extending from the apex side to an end side thereof.

12. The vehicle rear end structure according to claim 9, wherein a lower arm is attached to the cross member in a vicinity of the tunnel connection portion.

13. The vehicle rear end structure according to claim 9, wherein the frame comprises a bent portion, and an end of the cross member is connected to the bent portion.

14. The vehicle rear end structure according to claim 9, wherein the floor panel comprises a floor recessed portion formed in the high floor portion and having a downwardly convex shape when viewed from the vehicle front-rear direction,
a stiffener is provided at a central portion in a vehicle left-right direction below the floor recessed portion, and
the stiffener is connected to the cross member.

15. The vehicle rear end structure according to claim 9, wherein
a pair of left and right ridge lines formed at left and right ends of the top surface of the floor tunnel, and a pair of left and right ridge lines formed at left and right ends of the bottom surface of the tunnel connection portion are respectively continuous with each other on left and right sides.

* * * * *